Figure 1A:
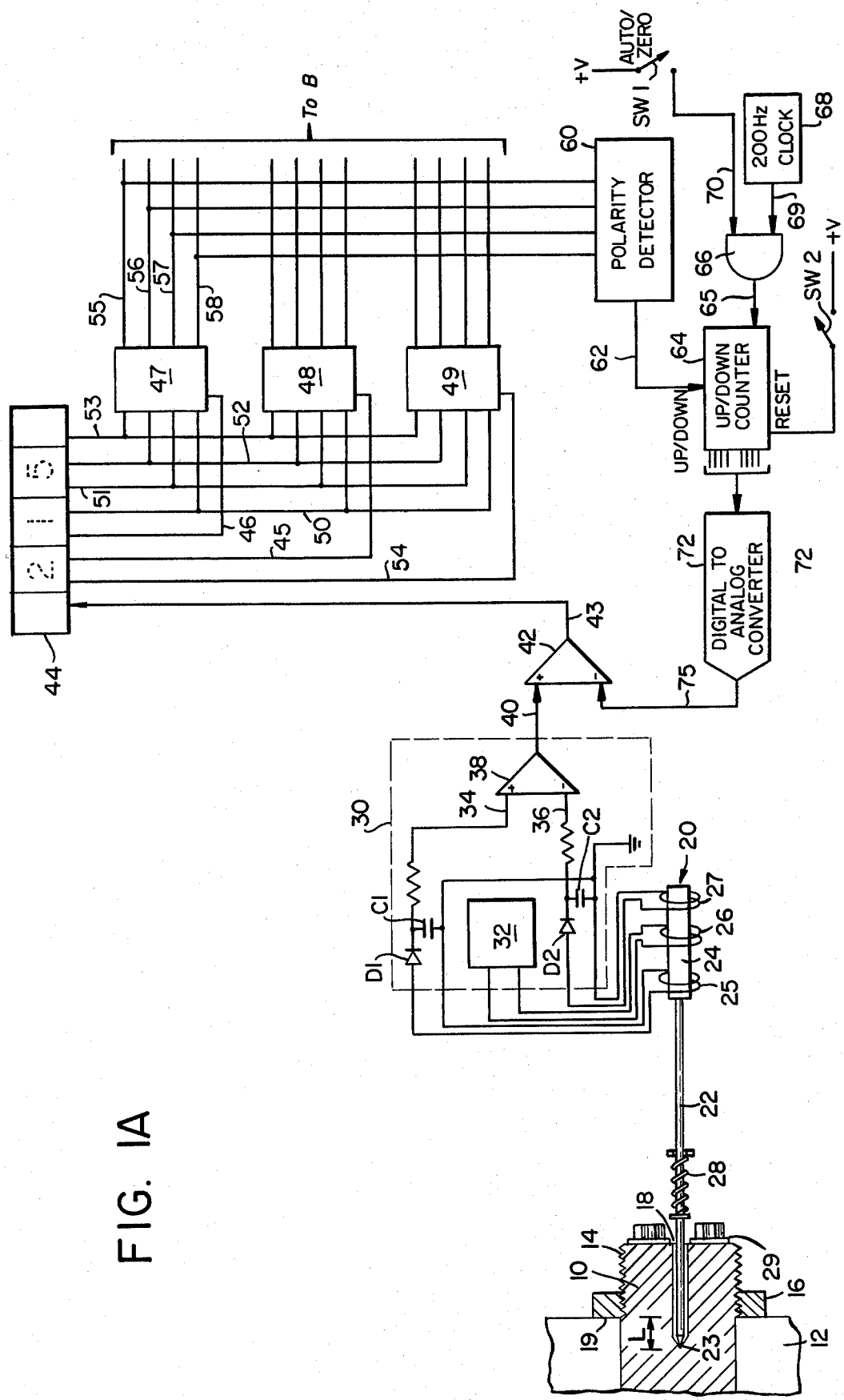

United States Patent [19]

Mickowski

[11] 4,383,449

[45] May 17, 1983

[54] STRESS MONITORING SYSTEM

[76] Inventor: John Mickowski, 129 Main St., Franklin, N.J. 07416

[21] Appl. No.: 259,979

[22] Filed: May 4, 1981

[51] Int. Cl.³ .............................................. G01B 7/24
[52] U.S. Cl. ........................................ 73/764; 73/1 B
[58] Field of Search ................ 73/764, 763, 760, 1 B, 73/862.48

[56] References Cited

U.S. PATENT DOCUMENTS 3,628,377 12/1971 Weiss .................................... 73/764
3,636,750 1/1972 Wojcik .................................. 73/1 B
4,059,991 11/1977 Dybel et al. ........................... 73/764

Primary Examiner—Jerry W. Myracle

[57] ABSTRACT

The stress monitoring system includes a transducer assembly coupled to the member to be monitored for providing an electrical analog signal having an amplitude proportional to the stress forces imposed on the member and a polarity corresponding to whether the member is in tension or compression, a panel meter responsive to the analog signal for recording the level of stress imposed on the member and automatic zero circuitry for nulling out any reading in the panel meter under no load conditions.

7 Claims, 2 Drawing Figures

STRESS MONITORING SYSTEM

This invention relates to a stress monitoring system with automatic zero control.

The ability to monitor and control stress in a structural member under tension or compression is of critical importance to die casters, injection molders and other users of highly stressed mechanical machinery. Maintenance of proper stress levels can eliminate costly downtime due to breakage of an overstressed member and should materially contribute toward increased machine longevity by decreasing unnecessary component wear. This is accomplished in accordance with the present invention by providing means to monitor the level of stress in the structural member under load such that it can be safely loaded to its optimum level required for a particular job. In a die casting machine, for example, employing a plurality of tie bars each may be separately monitored in accordance with the present invention to prevent unequal loading thereby minimizing problems unique to the particular die casting operation, such as, flash and hazardous hot metal expulsion.

Other important features of the stress monitoring system of the present invention include; the ability to automatically cancel out potential errors in the stress reading due to thermal expansion of the stressed structural member, the elimination of the need for periodic recalibration of the system and the simplicity of installation requiring only a minimum of skill and time without the need for a precise adjustment of the zero position under no lead, i.e., when the die is open.

Accordingly, it is the principal object of the present invention to provide a system for monitoring stress in a structural member with automatic zero control.

Other objects and advantages of the present invention will become apparent from the following detailed description of the invention when read in conjunction with the accompanying drawing illustrating schematically the system of the present invention.

Figure 1B:
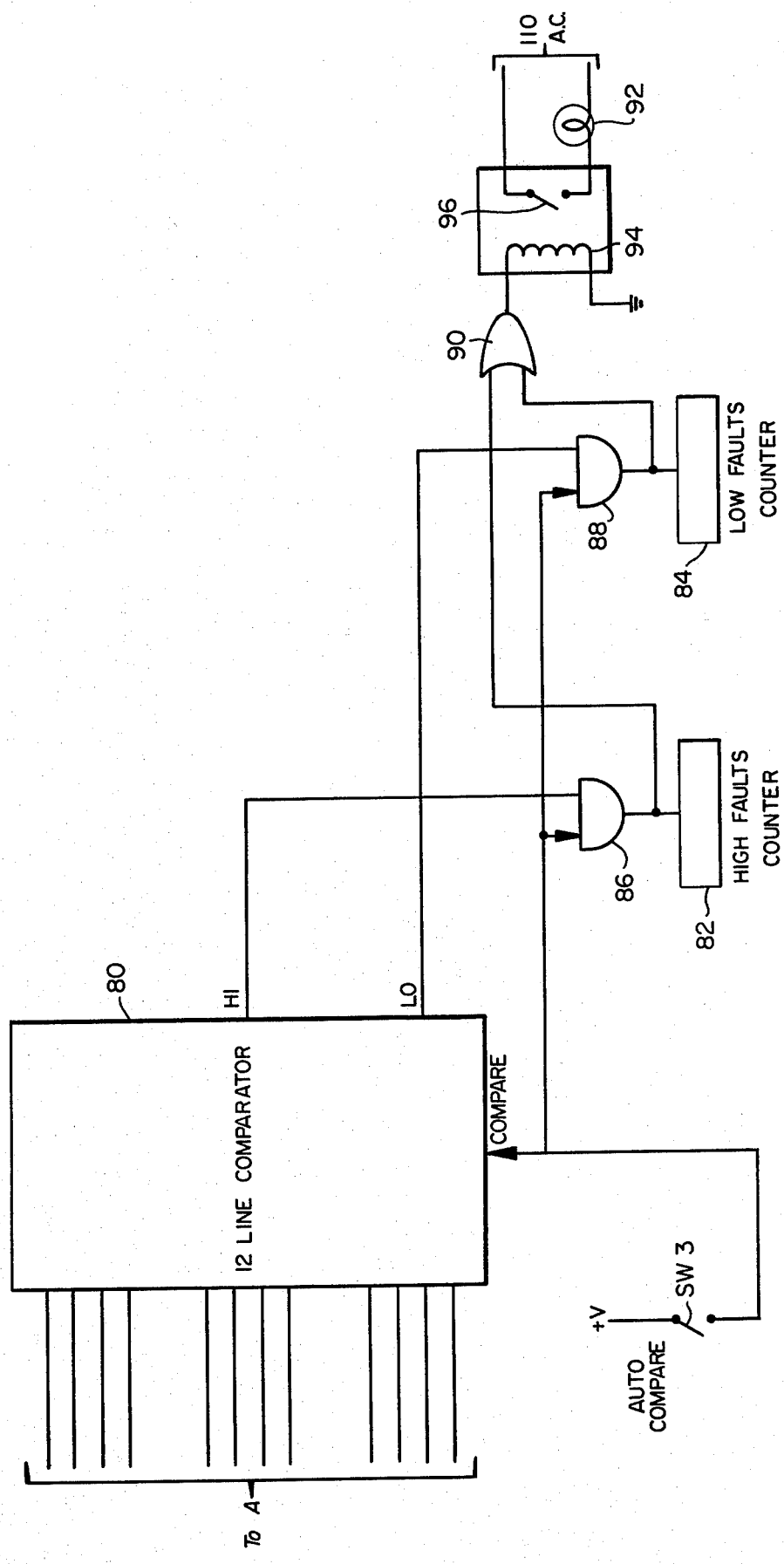

Referring now to the single FIGURE schematic drawing of the system embodied in FIGS. 1A and 1B of the present invention in which a structural member 10 is partially shown extending from the foundation or housing 12 of a machine (not shown). The structural member 10 may represent a single tie bar in a die casting machine which is intended to impose a substantial compressive or tensile load upon the structural member 10 in the normal operation of the machine. The end 14 of the structural member 10 is fixedly held in abutment against the housing 12 of the machine by means of a nut 16.

A drilling 18 is made through the end 16 of the structural member 10 a distance "L" beyond the abutting face 19 of the nut 16 and the housing 12. Stress in the structural member 10 is measured by sensing axial deviations from the preestablished distance "L". To sense such deviations a long probe 22 is inserted into the drilling 18 up to the drilled end 23. The probe 22 extends from a slug 24 which is magnetically coupled to a plurality of coils 25, 26 and 27 wound about the slug 24 to form a linear variable differential transformer 20. The linear variable differential transformer 20 is a commercially available transducer for sensing differential displacement of the core material, i.e., the slug 24 relative to the wound coils 25 and 27. In the present instant the slug 24 is connected to the probe 22 which, in turn, is biased by a spring 28 for urging the probe 22 against the drilled end 23 of the structural member 10. The spring 28 is adapted to be held in compression in a housing (not shown) in common with the probe 22 and the transducer slug 24. An end plate 29 is affixed to the end 14 of the structural member 10 for mounting the common housing (not shown) for the linear variable differential transformer elements and the spring 28 to the structural member 10.

The coils 25, 26 and 27 of the linear variable differential transformer 20 are connected to a hybrid integrated detection circuit 30. The detection circuit 30 generates a transducer analog output voltage 40 corresponding to the position of the transducer slug 24 relative to the wound position of the coils 25 and 27. Any stress encountered in the structural member 10 will cause a longitudinal movement of the probe 22 and a corresponding displacement of the transducer slug 24. The detection circuit 30 comprises an oscillator 32 for generating, for example, a 10 KH$_z$ alternating signal which is imposed on the center coil 26 surrounding the transducer slug 24. The coils 25 and 27 are coupled through diode detector circuits D1, C1 and D2, C2 to the positive and negative terminals 34 and 36 of an operational amplifier 38. The operational amplifier 38 generates the transducer output voltage 40 which is a DC signal representing the algebraic difference between the signals induced in the coils 25 and 27. The induced signal in coils 25 and 27 should be equal and opposite for a perfectly centered slug 24 relative to the coils 25 and 27.

The output 40 of the operational amplifier 38 is connected to the positive terminal 41 of a comparator 42 having an output 43 which is applied to a conventional digital panel meter 44. The digital panel meter 44 provides an LED display of, for example, 3 digits corresponding to the output voltage 43 of the comparator 42. The panel meter 44 can be calibrated to read out in any desired dimensional units. Unless the slug 24 is precisely positioned to provide a balanced output under a no load machine condition an output voltage 40 will be generated of either positive or negative polarity which will register and be recorded in the panel meter 44 as a stress reading. As will be discussed in more detail hereafter the present system provides for automatic zero compensation to eliminate the need for field calibration of the transducer 20.

The digital panel meter 44 has a seven line output with four lines 50, 51, 52 and 53 providing a binary coded decimal "BCD" four bit output corresponding to the number recorded by the meter 44 and another 3 lines 54, 55 and 56 for use as a 3 line multiplex strobe. The four output BCD lines 50, 51, 52 and 53 are connected to three storage latches 47, 48, and 49 respectively. The three output multiplex lines 54, 55 and 56 are used as clock signals for the storage latches 47, 48, and 49 in order to store the number recorded in the panel meter 44 in the storage latches 47, 48, and 49 respectively. The number recorded in the panel meter 44 is stored most significant digit first in the storage latch 47, followed by storage of the second most significant number in the storage latch 48 and, in turn, followed by storage of the least significant number in storage latch 49. Each of the storage latches 47, 48, and 49 are commercially available and represent a multiple number of flip-flops for storing each four bit BCD digit on lines 50, 51, 52, and 53. Accordingly, the three storage latches 50, 51, and 52 provide a 12 line output with each four lines representing one of the three BCD digits corresponding to the recorded number in the panel meter 44. The four line output 55, 56, 57, and 58 of the storage latch 47 is connected to a polarity detector 60 which may represent simply an And gate for providing a logical high or low signal 62 corresponding to a positive or negative DC output signal 40. The output 52 of the polarity detector 60 is applied to an "up/down" counter 64 with the direction of count being controlled by the logical state of the output signal 62. The up/down counter 64 is itself conventional and counts respectively in synchronizing with each input pulse 65 delivered from the Nand gate 66. A clock generator 68 is connected to the input 69 of Nand gate 66. The other input 70 is connected to a manually operated switch SW1 which when closed provides the automatic zero compensation of the present invention as will hereafter be explained in greater detail.

The output of the up/down counter 64 is applied to a conventional digital to analog counter 72 for providing an output analog signal 75 corresponding to the numerical count of the up/down counter 64. The analog signal 75 is applied to the negative terminal of the comparator 42. The automatic zero becomes effective when the operator closes switch SW1. The up/down proceeds to count the clock pulses generated by the clock generator 68 in a direction corresponding to the logical state of the output 62 from the polarity detector 64. This varies the analog voltage input 75 on the negative terminal of the comparator 42 thereby algebraically decreasing the comparator output voltage 43 to the panel meter 44. When the panel meter reaches zero any further increase or decrease will reverse the polarity detector output to maintain an automatic zero reading. The automatic zero switch SW1 can be opened after a null condition has been established. The count stored in the up/down counter 64 will continue to provide the zero offset input voltage 75 to the comparator 42. Accordingly, the panel meter 44 will now provide a true reading corresponding only to the stress imposed on the structural member 10. The up/down counter 64 can be reset by closing the transducer calibrate switch SW2 to permit an initial calibration adjustment of the transducer assembly 20.

The stress is monitored during operation of the machine by the 12 line comparator 80 which receives end of the 3 BCD digit inputs from the storage latches 47, 48, and 49. The comparator 80 is a conventional device which permits the operator to dial in (not shown) an input corresponding a high and low numerical value. These values are converted to BCD digits for comparison with the input BCD from the storage latches 47, 48, and 49. Accordingly, by closing switch SW3; e.g., when the die is closed, an automatic comparison is made to determine if the stored BCD digits are above or below the set values. A high fault counter 82 and a low fault counter 84 are used to count the number of high and low faults that may occur over a given interval of time. Each time a fault occurs the Nand gate 86 or 88 triggers the respective fault counters 82 or 84. An Or gate 90 is used to sound an alarm 92 for each fault whether high or low. The Or gate 90 energizes the relay 94 which closes the relay contact 96 for energizing the alarm.

What is claimed is:

1. A system for monitoring the stress imposed upon a structural member in a machine comprising:
   a transducer assembly including means connected to said structural member for providing an electrical analog signal having an amplitude responsive to the stress forces imposed upon said member and a polarity correspinding to tensile or compressive force upon said member;
   indicator means responsive to said analog signal for recording the level of stress in said member in appropriate dimensional units and for generating a digital signal corresponding to said analog signal; and
   automotive zero means for nulling out any reading in said indicator means under no load condition, said automatic zero means comprising:
   means for storing said digital signal;
   counter means for sequentially counting in a direction corresponding to the polarity of said analog signal;
   manual switch means for enabling said counter means;
   means for converting said count to an analog control signal; and
   comparator means for comparing said analog signal to said control signal and for providing said indicator means with an input error signal representing the algebraic difference of said compared analog signal and said control signal.

2. A system as defined in claim 1 further comprising additional comparator means having a predetermined set fault level, with said comparator means being responsive to said stored digital signal and said predetermined set fault level for providing an output pulse when said stored digital signal exceeds said set fault level and indicator means responsive to said output.

3. A system as defined in claim 2 further comprising other manual switch means for enabling said additional comparator means, fault counter means and gate means responsive to said other switch means and said output pulse for triggering said fault counter means each time said output pulse is generated.

4. A system as defined in claim 2 or 3 wherein said transducer assembly comprises a linear variable differential transformer having an adjustably movable core and a plurality of windings surrounding said core:
   means for imposing an alternating signal on a first of said plurality of winding intermediate a second and third winding;
   a first diode detector coupled to said second winding;
   a second diode detector coupled to said third winding; and
   means responsive to the difference between the induced signal in said second and third windings for generating said analog signal.

5. A system as defined in claim 4 further comprising a probe engaging said structural member for movement therewith along a longitudinal direction, said probe being connected to said movable core.

6. A system as defined in claim 5 wherein said means for storing said digital signal comprises a plurality of storage latches and further comprising a polarity detector coupled to one of said storage latches and said counter means for controlling the direction of count in said counter means.

7. A system as defined in claim 2 wherein said additional comparator means has a preset high fault value and a preset low fault value and wherein said additional comparator means is enabled automatically for comparing said stored digital signal with said high and low fault values and for providing separate output signals responsive to when said digital signal is above or below said high and low fault values respectively and wherein said machine is adapted to respond to said output signals for increasing or decreasing the stress imposed on said structural member to maintain the stress level within said preset high and low fault limits.

* * * * *